(12) United States Patent
Stong et al.

(10) Patent No.: US 11,802,608 B2
(45) Date of Patent: Oct. 31, 2023

(54) SIDEWALL FASTENING SYSTEM FOR A CONVEYOR BELT

(71) Applicants: Laitram, L.L.C., Harahan, LA (US); Dynamic Conveyor Corporation, Norton Shores, MI (US)

(72) Inventors: John Stong, Norton Shores, MI (US); Gabriel Nazar, New Orleans, LA (US); Gerko Hulshof, Aalten (NL); Martin Sprenkeler, Enschede (NL); Michael Hendrik DeGroot, Rockford, MI (US); Jeff Batchelder, Hesperia, MI (US); James R. Honeycutt, Jr., Grandville, MI (US)

(73) Assignee: Laitram, L.L.C., Harahan, LA (US)

( * ) Notice: Subject to any disclaimer, the term of this patent is extended or adjusted under 35 U.S.C. 154(b) by 45 days.

(21) Appl. No.: 17/668,960

(22) Filed: Feb. 10, 2022

(65) Prior Publication Data

US 2023/0250861 A1     Aug. 10, 2023

(51) Int. Cl.
| | |
|---|---|
| *F16G 3/00* | (2006.01) |
| *F16G 3/04* | (2006.01) |
| *B65G 15/32* | (2006.01) |
| *F16G 3/16* | (2006.01) |

(52) U.S. Cl.
CPC .............. *F16G 3/003* (2013.01); *B65G 15/32* (2013.01); *F16G 3/04* (2013.01); *F16G 3/16* (2013.01); *B65G 2201/02* (2013.01)

(58) Field of Classification Search
None
See application file for complete search history.

(56) References Cited

U.S. PATENT DOCUMENTS

| | | | |
|---|---|---|---|
| 4,109,784 A | 8/1978 | Hartmann | |
| 4,479,575 A | 10/1984 | Grundken et al. | |
| 7,556,145 B2* | 7/2009 | Elsner ............. | B65G 17/46 198/850 |
| 2020/0023594 A1 | 1/2020 | Helmer et al. | |

OTHER PUBLICATIONS

Thermodrive Synchronized Sidewall Mechanical Fastener Kit Installation Instructions, Intralox, L.L.C., 2013.
International Search Report and Written Opinion of the International Searching Authority, PCT/US2023/010201, dated May 9, 2023, Korean Intellectual Property Office, Republic of Korea.

* cited by examiner

*Primary Examiner* — William R Harp
(74) *Attorney, Agent, or Firm* — James T. Cronvich

(57) ABSTRACT

A flexible thermoplastic conveyor belt constructed of one or more belt segments having corrugated sidewalls. The one or more segments are joined end to end at one or more joints. The ends of the sidewalls at or near the joints are fastened together by fasteners to form a continuous sidewall along the length of the belt. The fasteners are toolless fasteners requiring no tools; they can be fastened and unfastened by hand alone.

54 Claims, 14 Drawing Sheets

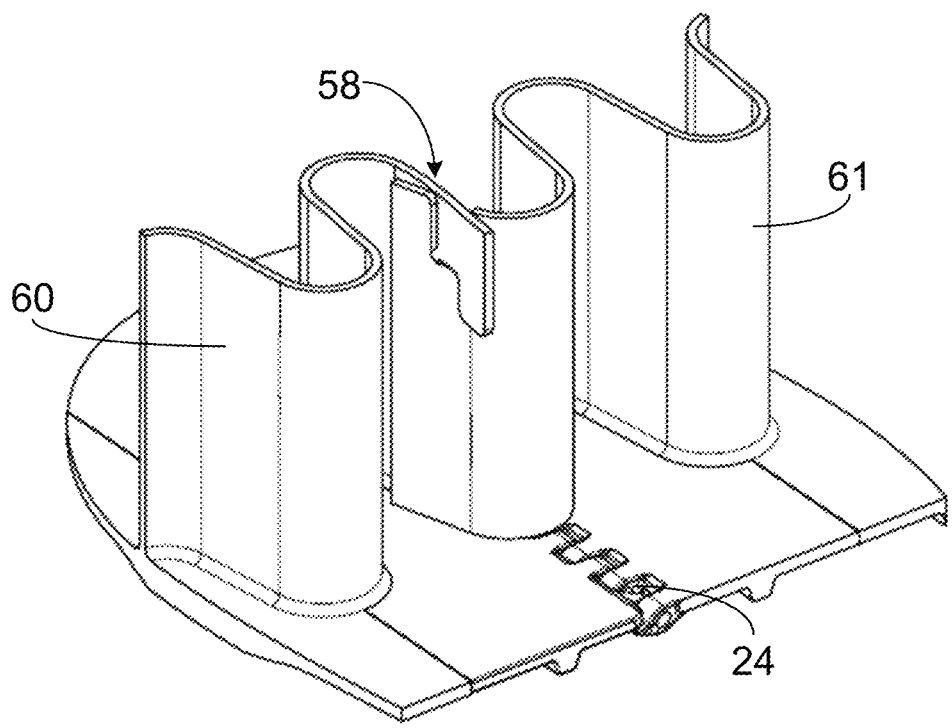
FIG. 3
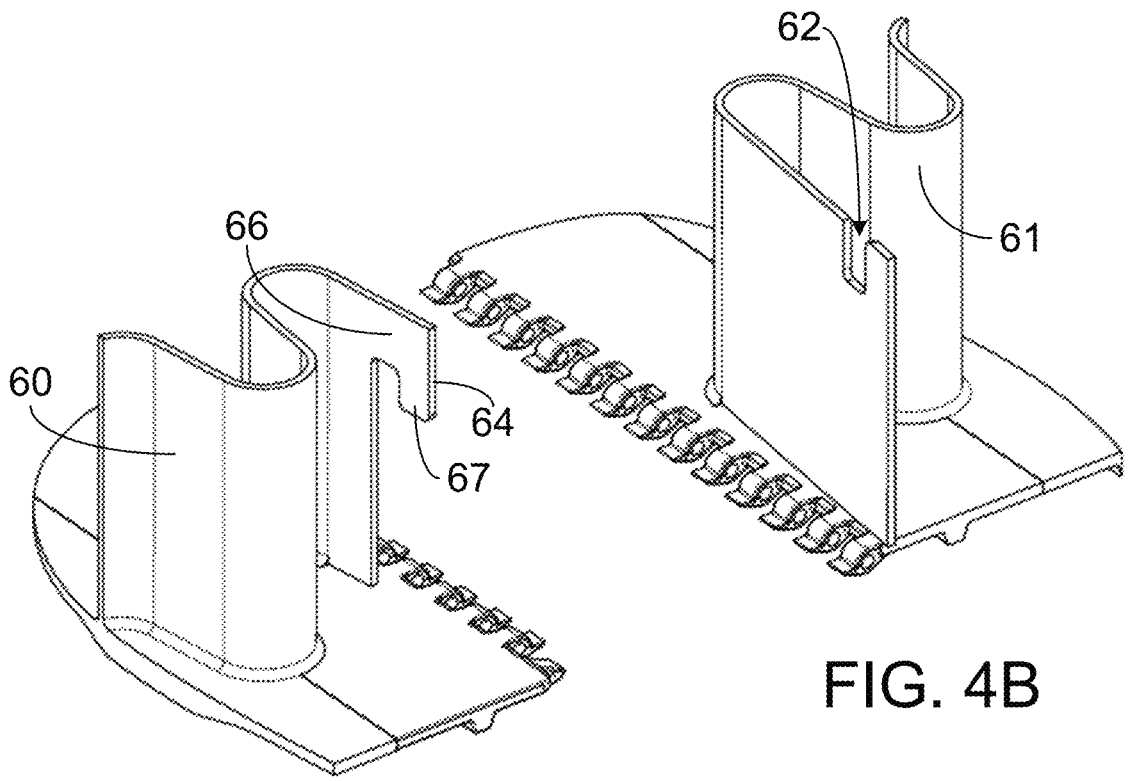
FIG. 4A
FIG. 4B

_US 11,802,608 B2_

SIDEWALL FASTENING SYSTEM FOR A CONVEYOR BELT

BACKGROUND

The invention relates generally to power-driven conveyor belts and more particularly to fastening the ends of sidewalls in belt segments at joints to form an endless conveyor belt with continuous sidewalls.

Thermoplastic conveyor belts that are flexible along their lengths and have few or no hinge joints are typically used to convey products in applications where hygiene and cleanliness are important. Modular plastic conveyor belts comprising rigid modules arranged in rows linked end to end at multiple hinge joints are not so hygienic. The many hinge joints in modular conveyor belts have nooks and crannies that can harbor bacteria that can be difficult to remove by washing. So flexible thermoplastic conveyor belts with few or no hinge joints are well suited for hygienic applications.

One example of such a flexible belt is made by welding one end of a long extruded belt segment to its other end to form an endless belt loop without a hinge joint. An endless hingeless belt could also be formed by welding multiple extruded belt segments end to end. Another example is a belt constructed of one or more belt segments having end portions butt-welded to opposite ends of extruded segments. Hinge eyes on the end portions at opposite ends of the belt segments to be joined are interleaved. A hinge rod is inserted in the lateral passageway through the interleaved hinge eyes to link the belt segments at a hinge joint. The hinge joint can be opened by withdrawing the hinge rod from the hinge joint to allow the belt to be removed from a conveyor. And because only one or a few hinge joints are required, the belt is still hygienic—especially compared to modular belts with many more hinge joints.

Unless contained, round products such as apples or pears, for example, are especially susceptible to falling off the sides of belts. Sidewalls along opposite sides of a conveyor belt are used to contain products on the belt. In the case of flexible thermoplastic belts, corrugated sidewalls along each side are often used. The corrugated structure gives the sidewalls the flexibility required to survive the bending of the belt as it negotiates drive and idle sprockets or drums. On hingeless belts the ends of the sidewalls can be welded together to form a continuous sidewall along the length of the endless belt loop.

On belts with hinges, however, the sidewalls can't be welded together at the hinge joints if the installation and removal advantages of the hinge joints are to be maintained. One way of joining the ends of sidewalls to each other at a hinge joint is to overlap extended ends of the sidewalls at each belt end to create a fold over the hinge joint. Holes are then drilled through the overlapping sidewall portions to match the holes in a pair of metal plates. The holes of one of the plates is aligned with the holes in the overlapping sidewall portions. Screws are then inserted in the plate and through the holes in the sidewall portions. The other plate is then slipped over the screw ends on the other side of the overlapping sidewall portions. Lock nuts are then used to secure the plates to fasten the ends of the sidewalls together to form a continuous sidewall along the length of the belt loop. For added security, a second pair of plates is similarly installed on the overlapping sidewall on the opposite side of the hinge joint. Besides being time-consuming, the installation of the plate requires the use of tools: a clamp to hold the two sidewall ends together, a drill to drill the screw holes, a block to back the sidewalls during drilling, and wrenches or screwdrivers to tighten the screws and nuts.

SUMMARY

One version of a conveyor belt embodying features of the invention comprises one or more belt segments joined at one or more joints into an endless conveyor belt loop that extends in width from a first side to a second side. A segment sidewall extends from a first end to a second end along each of the belt segments proximate the first side or the second side of the conveyor belt loop. A fastener joins a first end of a segment sidewall to a second end of a segment sidewall proximate each of the one or more joints to form a continuous sidewall proximate the first side or the second side and bridging the one or more joints. The fastener is a toolless fastener requiring no tools to join the first end and the second end.

Another version of a conveyor belt comprises one or more belt segments joined at one or more joints into an endless conveyor belt loop that extends in width from a first side to a second side. A segment sidewall extends from a first end to a second end along each of the belt segments proximate the first side or the second side of the conveyor belt loop. Each of the sidewalls includes a first fastener element integral with the segment sidewall at the first end and a second fastener element integral with the segment sidewall at the second end. The segment sidewalls are joined first end to second end by engaging the first fastener elements with the second fastener elements to interlock the first ends with the second ends and form a continuous sidewall proximate the first side or the second side and bridging the one or more joints.

Yet another version of a conveyor belt comprises one or more belt segments joined at one or more joints into an endless conveyor belt loop that extends in width from a first side to a second side. A segment sidewall extends from a first end to a second end along each of the belt segments proximate the first side or the second side of the conveyor belt loop. A clip joins a first end of a segment sidewall to a second end of a segment sidewall proximate each of the one or more joints to form a continuous sidewall proximate the first side or the second side and bridging the one or more joints.

BRIEF DESCRIPTION OF THE DRAWINGS

FIG. 3 is an enlarged view of one side of a conveyor belt showing another version of a sidewall fastener.

FIGS. 4A and 4B are isometric views of opposite ends of conveyor belt segments to be joined to form the conveyor belt of FIG. 3.

DETAILED DESCRIPTION

Figure 1:
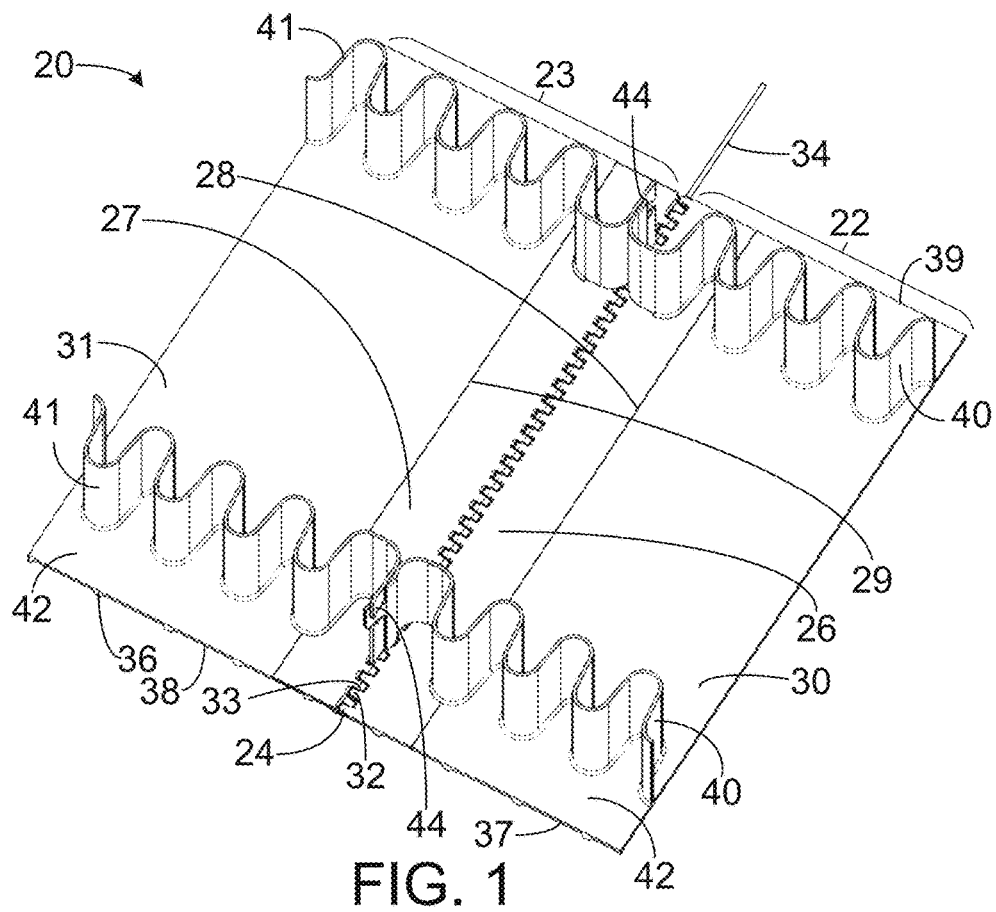
FIG. 1 is an isometric view of a portion of an endless flexible thermoplastic conveyor belt having corrugated sidewalls embodying features of the invention.

A portion of an endless conveyor belt that is flexible along its length and has sidewalls fastened by one version of a fastening system is shown in FIG. 1. The conveyor belt 20 is constructed of one or more belt segments 22, 23 joined at a hinge joint 24. Each belt segment 22, 23 includes a hinge portion 26, 27 butt-welded to an end 28, 29 of a long main portion 30, 31. The main portion 30, 31 is typically made by extrusion, and the hinge portions 26, 27 are typically molded. Both are made of a resilient material, such as a thermoplastic polymer—polyurethane, for example—an elastomer, or a rubber. Each hinge portion 26, 27 has a set of hinge eyes 32, 33 spaced apart laterally along the ends of the belt segments 22, 23. The hinge eyes 32, 33 at opposite ends of a single belt segment or of adjacent belt segments to be joined are interleaved and aligned to form a lateral passageway. A hinge rod 34 inserted in the passageway connects the ends together at the hinge joint 24.

An endless conveyor belt can be constructed of a single belt segment whose ends are linked at a hinge joint 24, or it can be constructed of multiple belt segments linked at multiple hinge joints. In this example, each belt segment 22, 23 has regularly spaced drive bars 36 extending laterally across the width of the belt 20 on its bottom from a first side 38 to an opposite second side 39. The drive bars 36 are engaged by motor-driven sprockets or drums that drive the belt 20. The drive bars 36 may be formed by machining away material from an extruded sheet, by calendering the sheet immediately after extrusion, or by physical attachment of a separately formed drive bar. The belt could alternatively have drive bars or lugs that don't extend across the entire belt width or could be devoid of drive bars and friction-driven by pulleys instead.

Segment sidewalls 40, 41 extend the length of each belt segment 22, 23 along the first and second sides 38, 39. The segment sidewalls 40, 41 are corrugated for flexibility as the belt 20 bends around sprockets, pulleys, or drums. The bottoms of the segment sidewalls 40, 41 are welded to the top 42 of the belt segments 30, 31 except near their ends at the hinge portions 26, 27. The welded lengths of the segment sidewalls 40, 41 follow a regular corrugated pattern synchronized with the regular spacing of the drive bars 36 and with the segment sidewalls on the other side of the belt segment. The unwelded ends of the segment sidewalls 40, 41 are joined by fasteners 44 proximate the hinge joint 24 to form continuous sidewalls proximate the first and second sides 38, 39 of the conveyor belt 20. In this version the segment sidewalls 40, 41 are indented slightly inward of the belt edges at the first and second sides 38, 39.

Figure 2A:
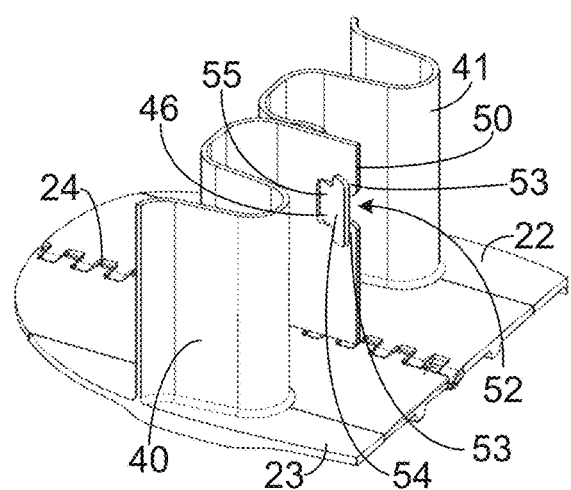
FIGS. 2A and 2B are enlarged views from two perspectives of one side of the conveyor belt of FIG. 1 showing one version of a sidewall fastener.
Figure 2B:
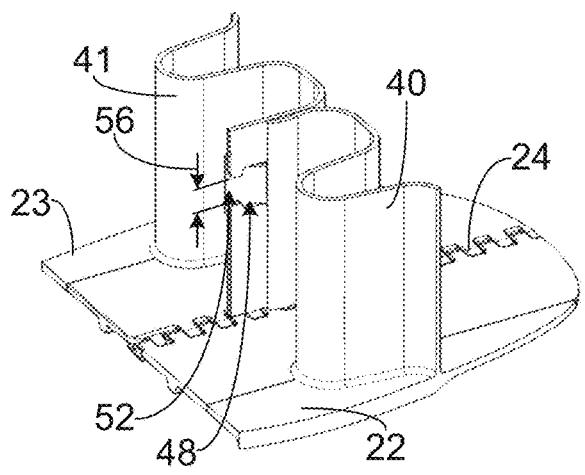

The sidewall fastener 44 is shown in more detail in FIGS. 2A and 2B. The fastener 44 comprises two fastener elements: (1) a tab 46 at the end of the first segment sidewall 40; and (2) a wall slot 48 at the end of the second segment sidewall 41. The wall slot 48 opens onto a vertical edge 50 of the second segment sidewall 41 through a narrowed gap 52 formed by two confronting lips 53 at the edge. The tab 46 has an enlarged head 54 connected to the vertical edge 51 of the first segment sidewall 40 by a narrower neck 55. The width 56 of the gap 52 from lip to lip is less than the width of the neck 55 to retain the tab 46 in the wall slot 48. And the outer dimensions of the head 54 are greater than the maximum dimension of the wall slot 48. Because the segment sidewalls 40, 41 are made of the same flexible thermoplastic material as the belt segments 22, 23, the second segment sidewall 41 can be elastically deformed to widen the gap 52. And the tab 55, which is made from the same material as the sidewalls, can be bent and twisted to fit through the widened gap and into a relaxed locking position in the wall slot 48 as in FIGS. 2A and 2B. To unfasten the two segment sidewalls 40, 41, the tab 46 can be elastically deformed and the gap 52 widened as needed to allow the tab to be passed through. In this version the fastener is shown positioned directly above the hinge joint 24.

Another version of a sidewall fastener 58 is shown in FIGS. 3, 4A, and 4B. In this version the first segment sidewall 60 includes at its end a first fastener element in the form of a hook-shaped tab 64 having a shank 66 extending horizontally to a hook end 67 depending perpendicularly from the end of the shank. The second segment sidewall has a wall slot 62 in the form of a notch that opens onto a top horizontal edge of the sidewall as a second fastener element. The shank 66 is received in the slot 62 through its open end at the top edge of the second segment sidewall 60. The hook end 67 of the tab 64 hooks against the outer side of the second segment sidewall 60 to lock the segment sidewalls 60, 61 and form a continuous sidewall. In this version the fastener 58 is offset from the hinge joint 24 along the length of the conveyor belt.

Yet another version of a sidewall fastener is shown in FIGS. 5A-5E, which also depict the sequence of steps followed to join the belt segment ends and the ends of the segment sidewalls. The fastener 68 includes a tab 70 similar to the tab 46 of FIGS. 2A and 2B as a first fastener element.

The tab 70 has an enlarged head 72 in the form of an arrowhead at the end of a shaft 74, or neck, extending outward from the vertical edge 76 at the first end 80 of the first segment sidewall 78 on the first belt segment end 82. The tab 70 is made of the same material as, and formed with, the sidewall. The second segment sidewall 79 on the second belt segment end 83 has a wall slot 84 formed in its second end 81 as a second fastener element. The wall slot 84 has a closed periphery 85. The wall slot 84 is shown as oval-shaped with dimensions less than the maximum outer dimension of the arrowhead 72. But the wall slot 84 could be shaped otherwise. For example, it could be circular, elliptical, or rectangular; or it could even be a narrow slit.

Figure 20:
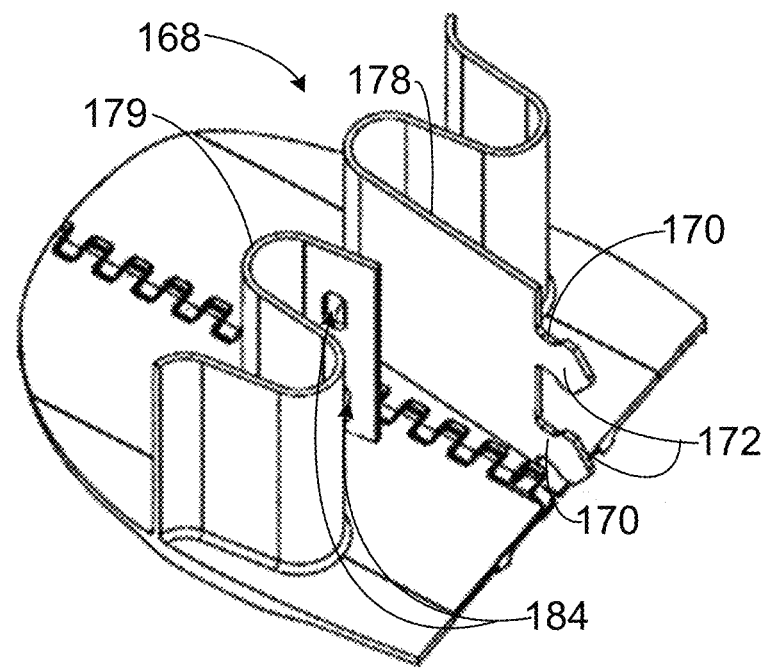
FIG. 20 is an isometric view of another version of a sidewall fastener as in FIGS. 5A-5E with duplicate fastening elements.
Figure 21:
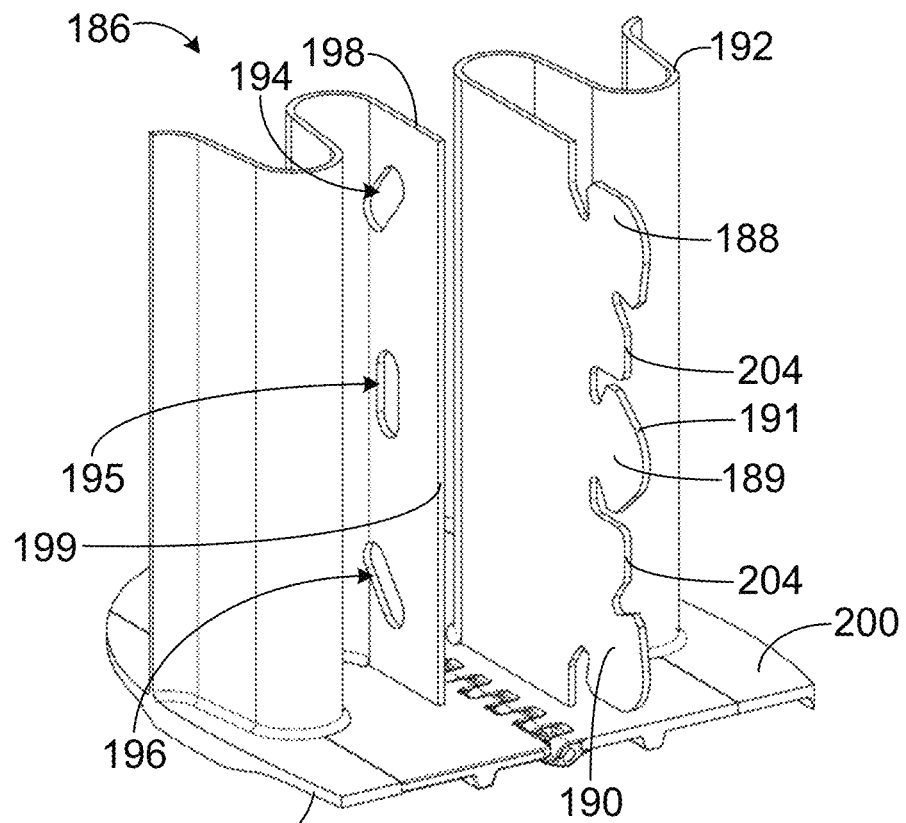
FIG. 21 is an axonometric view of a sidewall fastener as in FIG. 20 with three fastening elements.

For increased security, a sidewall fastener 168 as in FIG. 20 has two tabs 170 and two arrowheads 172 on a first segment sidewall 178 and two wall slots 184 on a second segment sidewall 179. An even more secure version is shown in FIG. 21. A sidewall fastener 186 has three tabs 188, 189, 190 with enlarged heads 191 on a first segment sidewall 192 and three wall slots 194, 195, 196 in a second segment sidewall 198. The middle tab 189 extends from the first segment sidewall 192 parallel to the top face 200 of the conveyor belt 202. The upper tab 188 is angled upward, and the lower tab 190 is angled downward. The corresponding upper and lower wall slots 194, 196 are similarly angled obliquely on the second segment sidewall 198. The upper wall slot 194 is elongated upwardly and outwardly toward the vertical edge 199 of the second segment sidewall 198, and the lower wall slot 196 is elongated downwardly and outwardly toward the vertical edge. The middle wall slot 195 is vertically elongated. Stop faces 204 extending from the first segment sidewall 192 between the tabs 188, 189, 190 rest against the second segment sidewall 198 when the tabs are inserted in the wall slots 194, 195, 196 to fasten the sidewalls together.

Figure 5A:
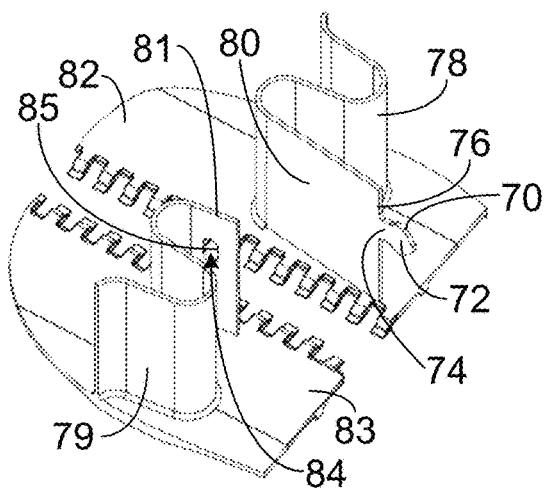
FIGS. 5A-5E show step-by-step the joining of two belt segments and their sidewalls using a third version of a sidewall fastener.
Figure 5B:
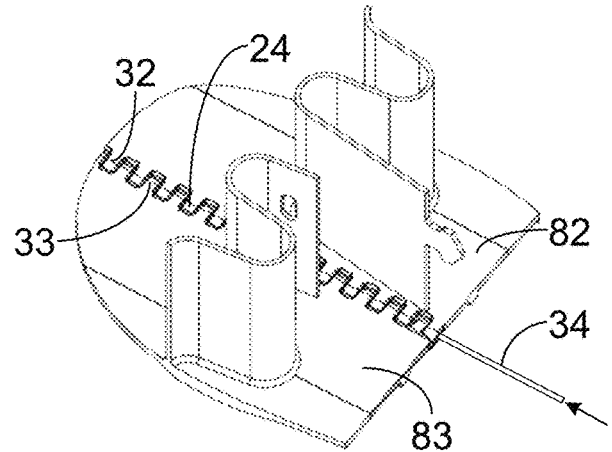
Figure 5C:
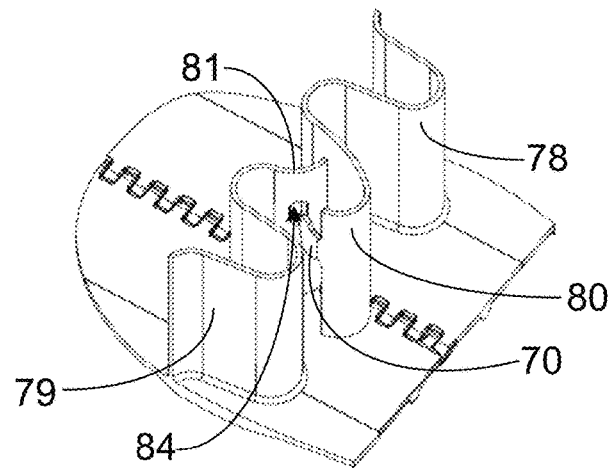
Figure 5D:
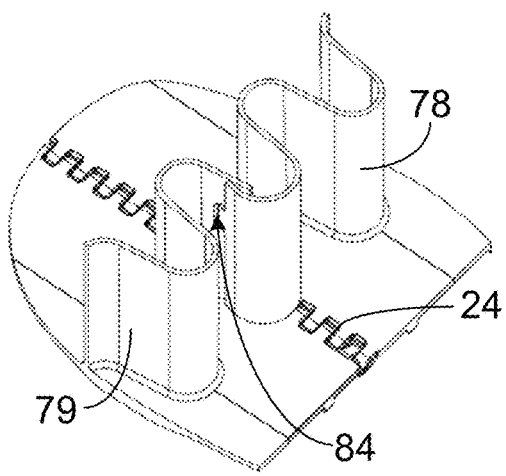
Figure 5E:
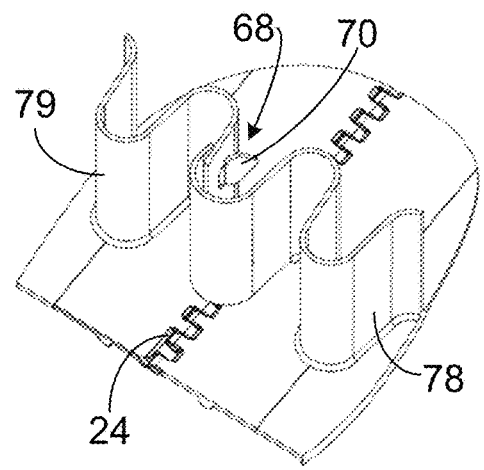

The sequence of joining the two belt segments 80, 81 and the segment sidewalls 78, 79 is shown in FIGS. 5A-5E. The two separated belt segment ends 82, 83 of FIG. 5A are brought together in FIG. 5B with their hinge eyes 32, 33 interleaved. A hinge rod 34 is then inserted in the lateral passageway formed by the aligned, interleaved hinge eyes 32, 33 to link the segment ends 82, 83 together at a hinge joint 24. As shown in FIG. 5C, the longer first end 80 of the first segment sidewall 78 is pulled past the hinge joint 24 outside of the shorter second end 81 of the second segment sidewall 79 and folded around the second segment sidewall. Then the tab 70 is lined up with the wall slot 84. Finally, the tab 70 is deformed and pushed through the wall slot 84 as shown in FIGS. 5D and 5E to join the segment sidewalls 78, 79 and form a continuous sidewall that bridges the hinge joint 24. A similar sequence of steps applies to the fasteners and belt segments of FIGS. 2A-4B.

Figure 6A:
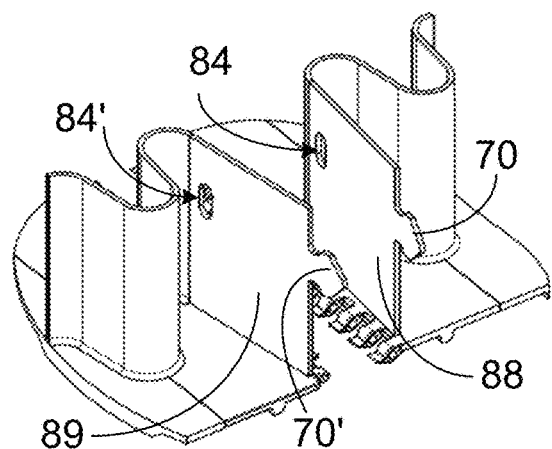
FIGS. 6A-6F show step-by-step the joining of two belt segments and their sidewalls using a dual version of the fastener of FIGS. 5A-5E.
Figure 6B:
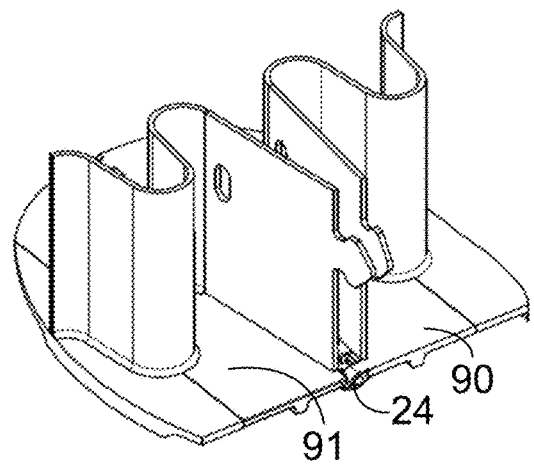
Figure 6C:
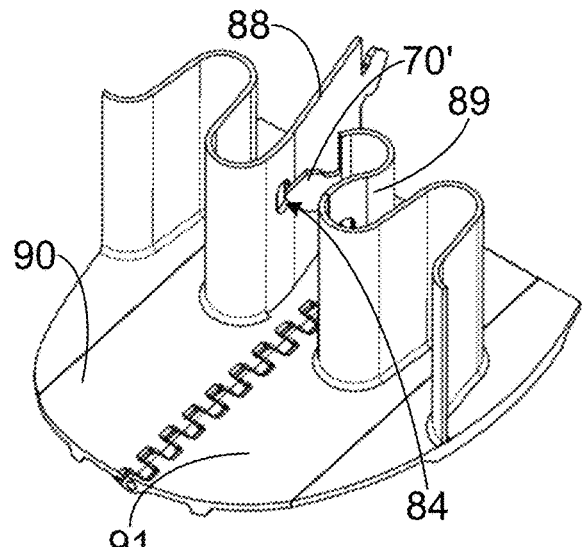
Figure 6D:
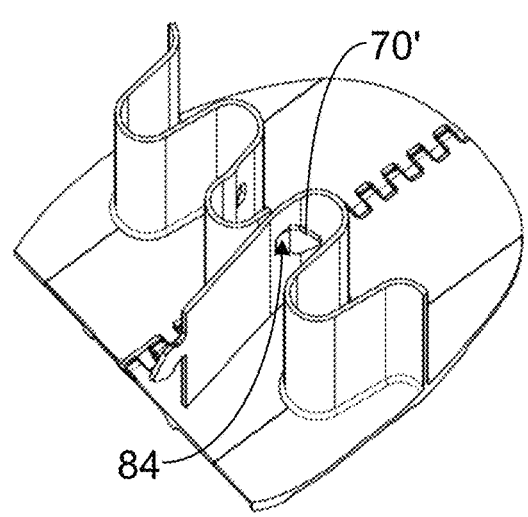
Figure 6E:
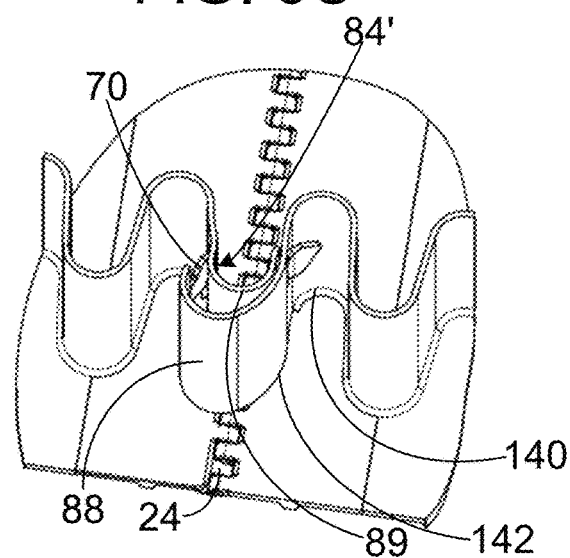
Figure 6F:
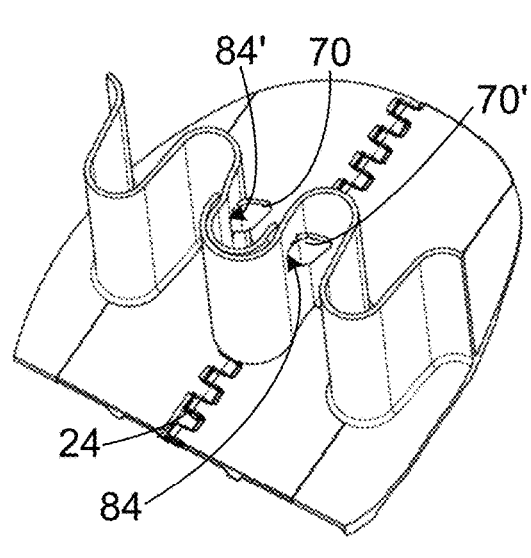

FIGS. 6A-6F show a sidewall fastening system with dual fasteners, each like the fastener 68 of FIGS. 5A-5E. Each segment sidewall end 88, 89 has tabs 70, 70' and slots 84, 84'. The sidewall joining sequence is shown in FIGS. 6C-6F. After the first and second segment ends 90, 91 are linked together at the hinge joint 24 as in FIG. 6B, the second segment sidewall end 89 is folded past the hinge joint, and its tab 70' is aligned with the wall slot 84 in the first sidewall end 88. The tab 70' is then pushed through the wall slot 84 as in FIG. 6D. Next, as shown in FIG. 6E, the first sidewall end 88 is folded around the second sidewall end 89, and its tab 70 is aligned with the wall slot 84' in the second sidewall end. The tab 70 is then pushed through the wall slot 84' in the second sidewall end to secure the segment sidewall ends 88, 89 together, as shown in FIG. 6F. In this version the fasteners lie on opposite sides of the hinge joint 24.

Figure 7A:
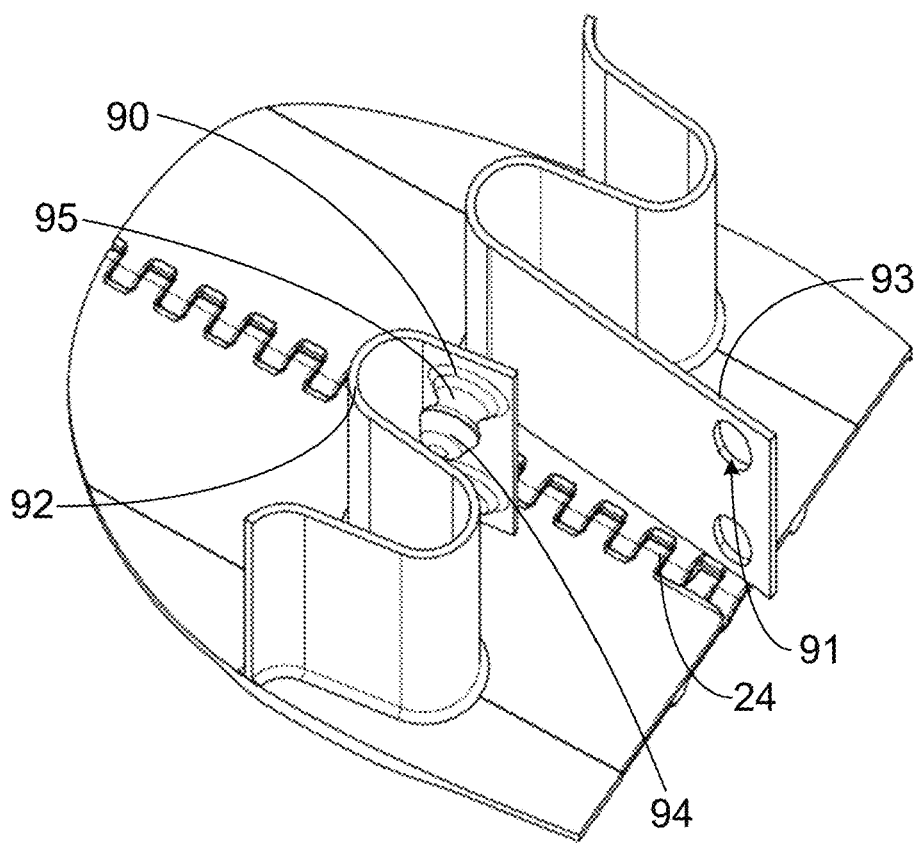
FIGS. 7A and 7B are views from two perspectives of yet another version of a sidewall fastener.
Figure 7B:
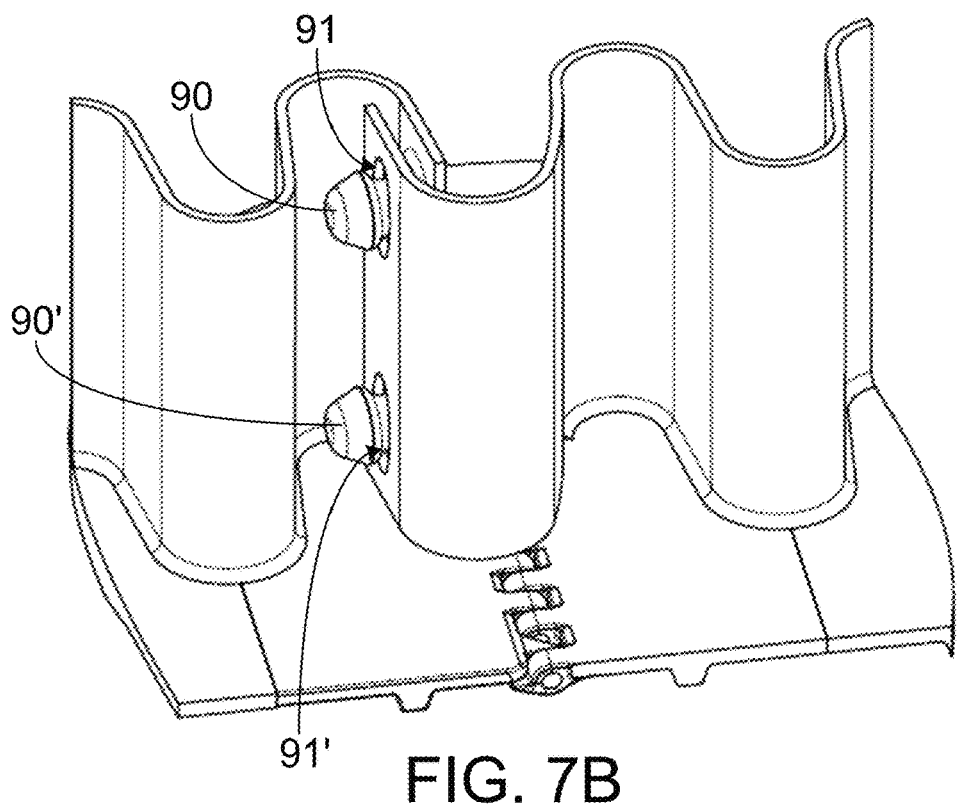

Another sidewall fastener is shown in FIGS. 7A and 7B. In this version the first fastener element is a rigid mushroom-shaped knob 90, or tab, permanently affixed to the first sidewall end 92. The second fastener element is a closed wall slot 91 formed in the second sidewall end 93. The knob 90 has an enlarged head 94 at the end of a stem 95, or neck. The dimensions of the wall slot 91 are less than the maximum outer dimensions of the head 94 of the knob 90, but greater than the outer dimensions of the neck 95. After the longer second segment end 93 is folded past the hinge joint 24 so that its wall slot 91 aligns with the knob 90, the knob is pushed through the wall slot to join the segment sidewalls. The fastener shown in FIGS. 7A and 7B has a second knob 90' and a corresponding second wall slot 91' for additional security. But a single knob and slot could be used.

Figure 8A:
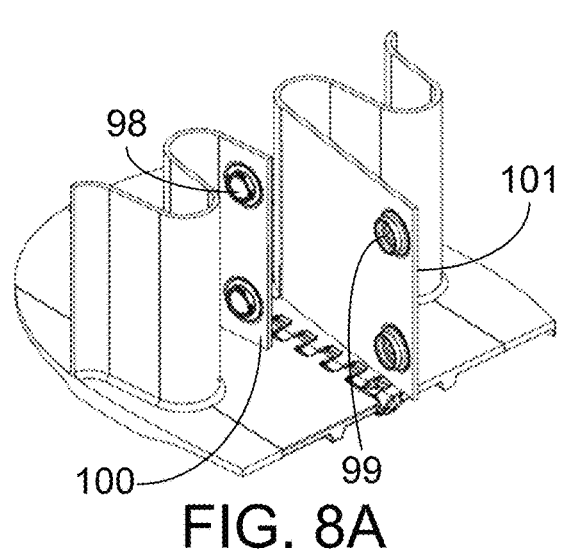
FIGS. 8A and 8B are views from two perspectives of a sidewall-fastening snap before connection.
Figure 8B:
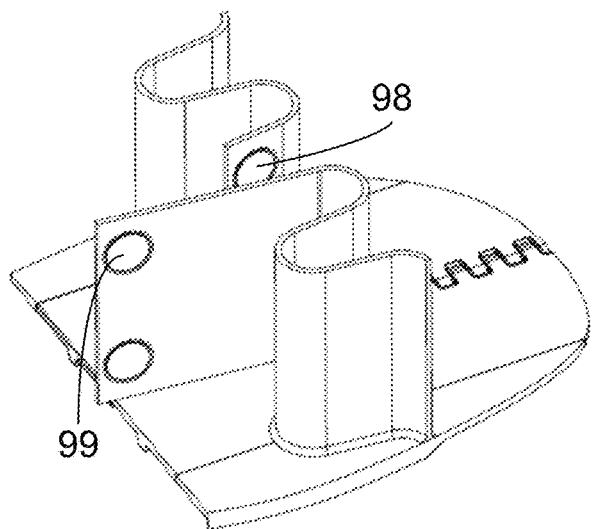
Figure 8C:
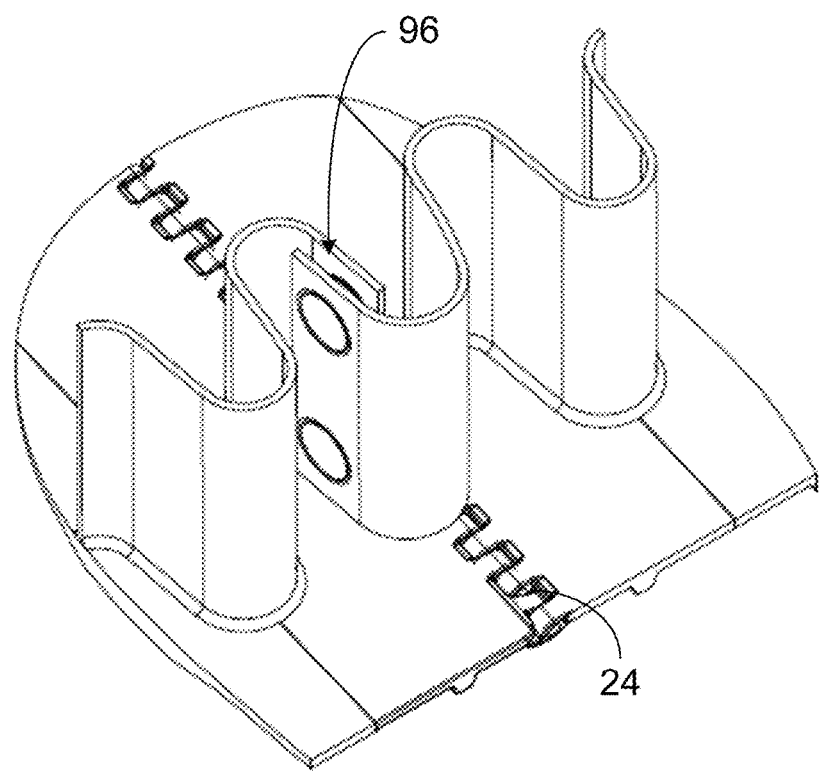
FIG. 8C shows the edge portion of the conveyor belt after the sidewalls are snapped together.

The fastener 96 shown in FIGS. 8A-8C uses male and female snaps 98, 99 as fastener elements. In this example, two pairs of snaps are shown, but a single pair of snaps could be used. The snaps 98, 99 are permanently affixed to the segment sidewall ends 100, 101. The snaps 98, 99 snap together to join the folded sidewall ends 100, 101 offset from the hinge joint 24.

Figure 9A:
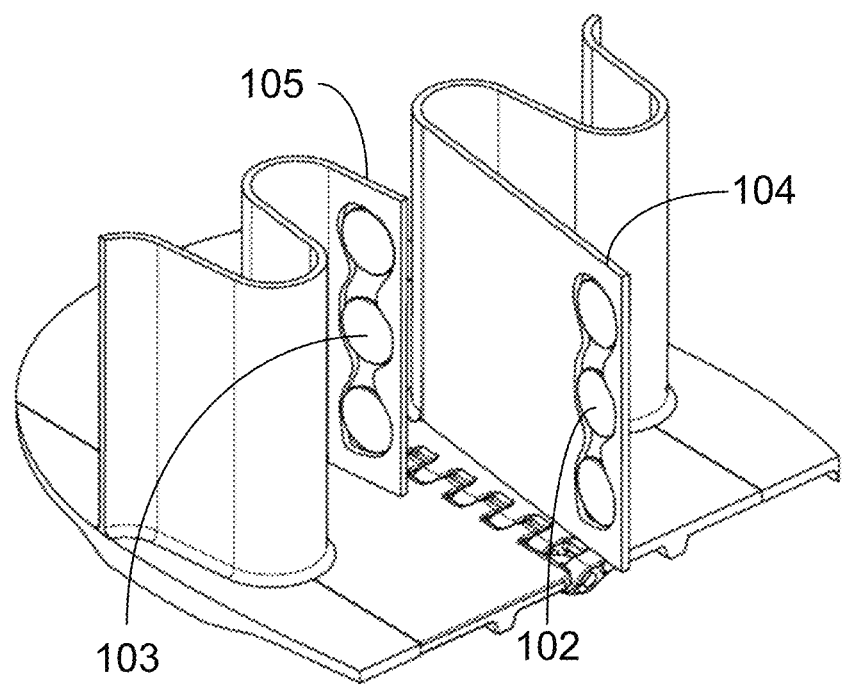
FIGS. 9A and 9B are views of one side of a conveyor belt before and after its segment sidewalls are fastened magnetically.
Figure 9B:
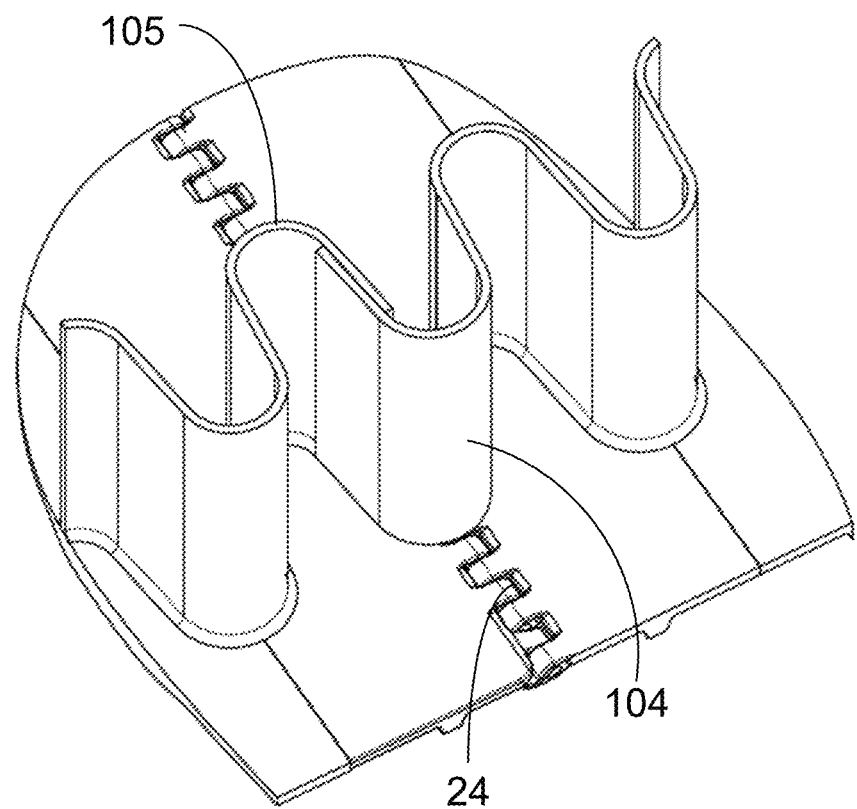

A magnetic sidewall fastener is shown in FIGS. 9A and 9B. One or more permanent magnets 102—three in this example—are embedded in the first segment sidewall end 104. Embedded in the second segment sidewall end 105 are three permanent magnets 103 that align spatially with the permanent magnets 102 in the other sidewall end 104. (The segment sidewall ends 104, 105 are shown cut away to reveal the magnets 102, 103.) The poles of the magnets 102, 103 are arranged so that the magnets attract each other and join the segment sidewall ends 104, 105 as shown in FIG. 9B to form a continuous sidewall bridging the hinge joint 24. Ferrous elements could be substituted for the magnets in one of the segment sidewall ends. The magnets in the other segment sidewall end would attract the ferrous elements to hold the ends together.

All the fasteners described thus far have included fastener elements that are integral with the segment sidewalls in that they are permanent parts of the segment sidewalls by being extensions or appendages of, or openings in, the sidewalls as in FIGS. 1-6F or by being captive elements due to their permanent affixation to the sidewalls as in FIGS. 7A-9B. And none of the integral sidewall fasteners requires tools to fasten or unfasten the ends of the segment sidewalls together. Fastening and unfastening can be done by hand alone with these toolless fasteners.

Another family of toolless fasteners that can be used to fasten and unfasten segment sidewalls by hand without the aid of tools, but that include fastening elements not all completely integral parts of the sidewalls, are shown in FIGS. 10A-12B. This family consists of clips and connecting members.

Figure 10A:
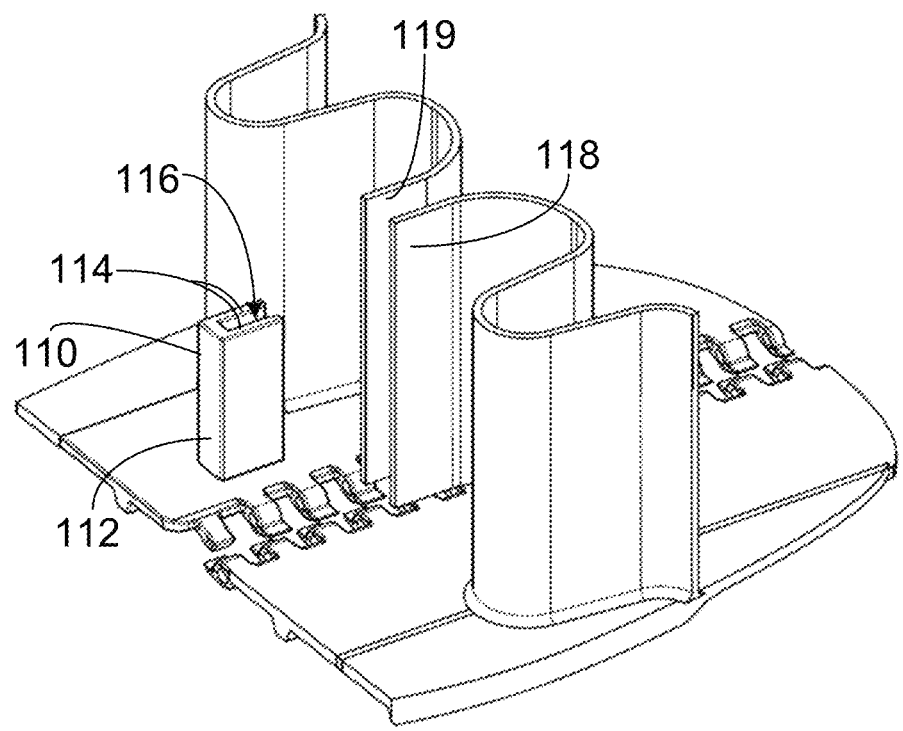
FIGS. 10A and 10B are views of one side of a conveyor belt before and after its sidewalls are fastened by a U-shaped clip.
Figure 10B:
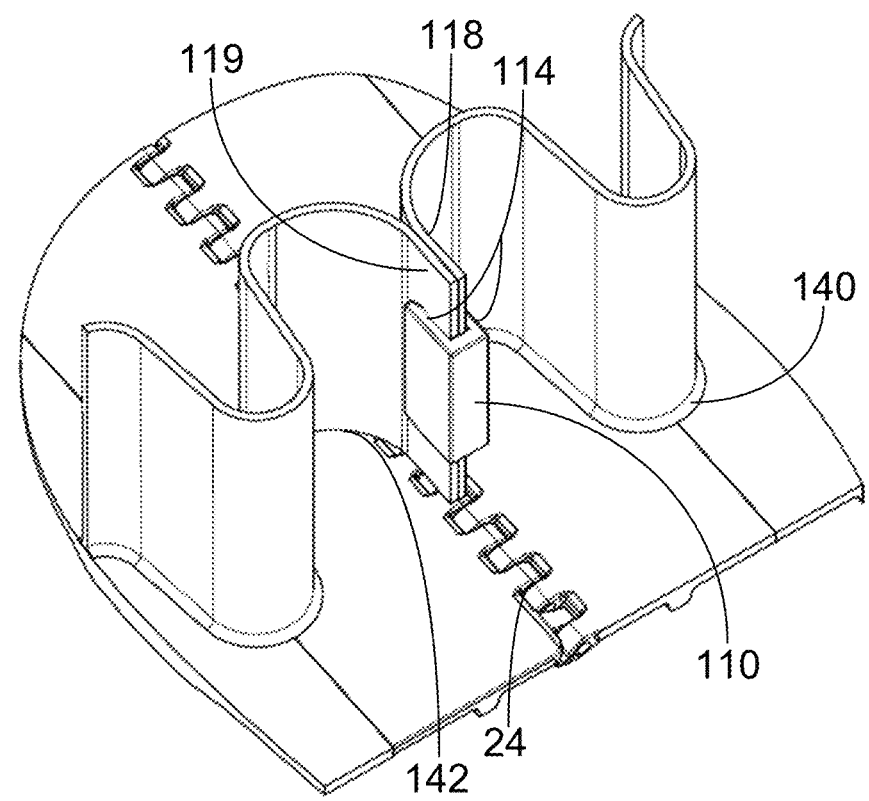

FIGS. 10A and 10B show a clip 110 having a base 112 and two parallel arms 114 bounding a clip slot 116. The clip 110 is U-shaped in cross section and is long enough from top to bottom and its slot 116 is deep enough to secure the first and second ends 118, 119 of the segment sidewalls together. As shown in FIG. 10B, the two segment sidewall ends 118, 119 are compressed tightly together side by side in the slot 116 of the U-shaped clip 110 in an interference fit. The distal ends of the clip's arms 114 are beveled to ease insertion of the edges of the segment sidewall ends 118, 119 into the clip slot 116. With the U-shaped clip 114, the two segment sidewall ends 118, 119 are not folded around each other. Rather, they are held side by side by the clip 110 directly above the hinge joint 24.

Figure 11A:
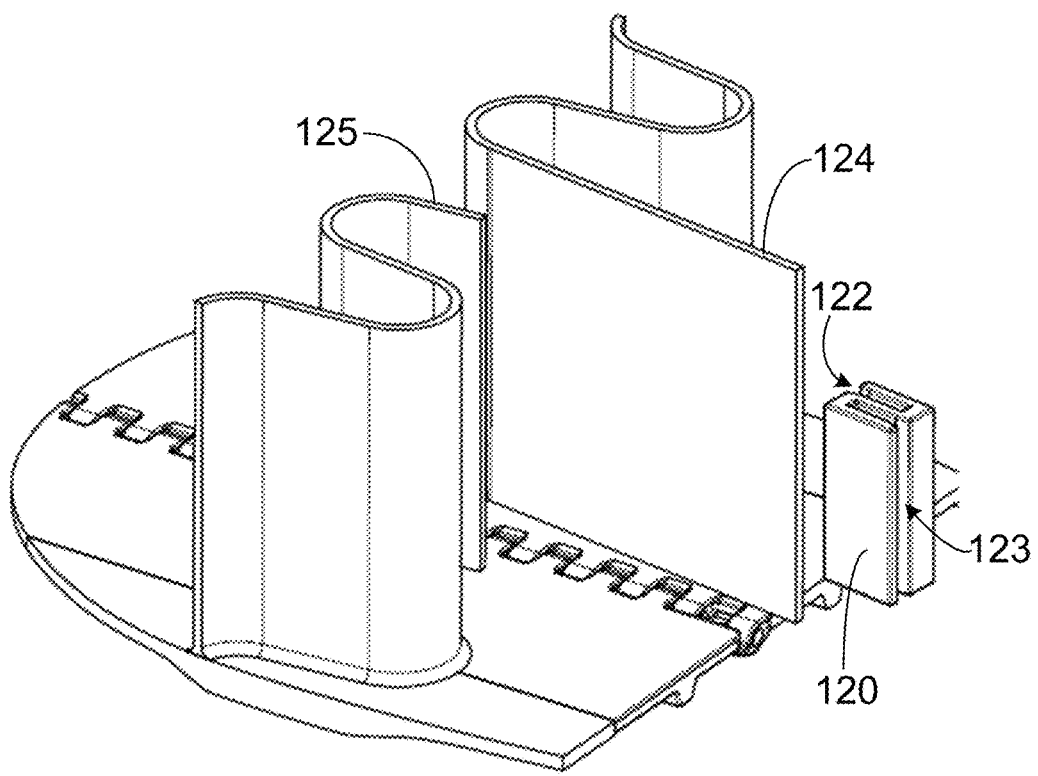
FIGS. 11A and 11B are views of one side of a conveyor belt before and after its sidewalls are fastened by an S-shaped clip.
Figure 11B:
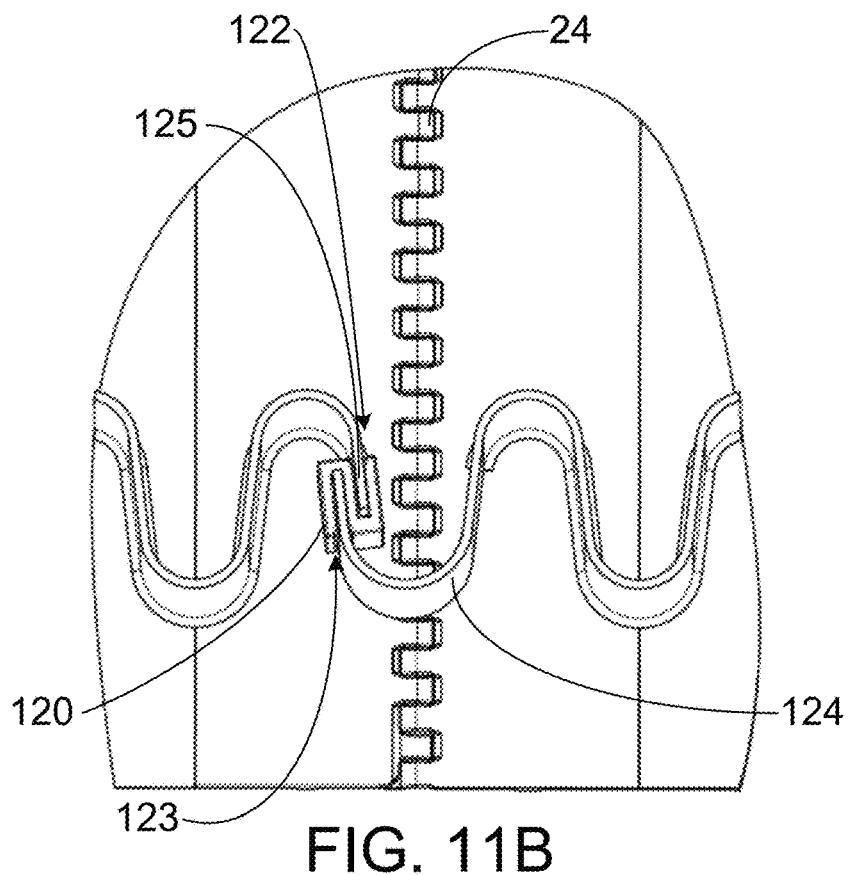

An S-shaped clip 120 is shown in FIGS. 11A and 11B. The clip 120 is S-shaped in cross section forming two parallel clip slots 122, 123 that open in opposite directions. Like the U-shaped clip 110 of FIGS. 10A and 10B, the S-shaped clip 120 is beveled at the openings into the slots 122, 123 to ease entry of the segment sidewall ends 124, 125. As shown in FIG. 11B, the longer end 124 of the first segment sidewall is folded to overlap the shorter end 125 of the second segment sidewall on the second segment sidewall's side of the hinge joint 24. The end 124 of the first segment sidewall is received in the outward opening clip slot 123, and the end 125 of the second segment sidewall is received in the inward opening clip slot 122. Thus, the S-clip fastener secures the segment sidewalls into a continuous sidewall at a point offset from the hinge joint 24 along the length of the belt.

Figure 12A:
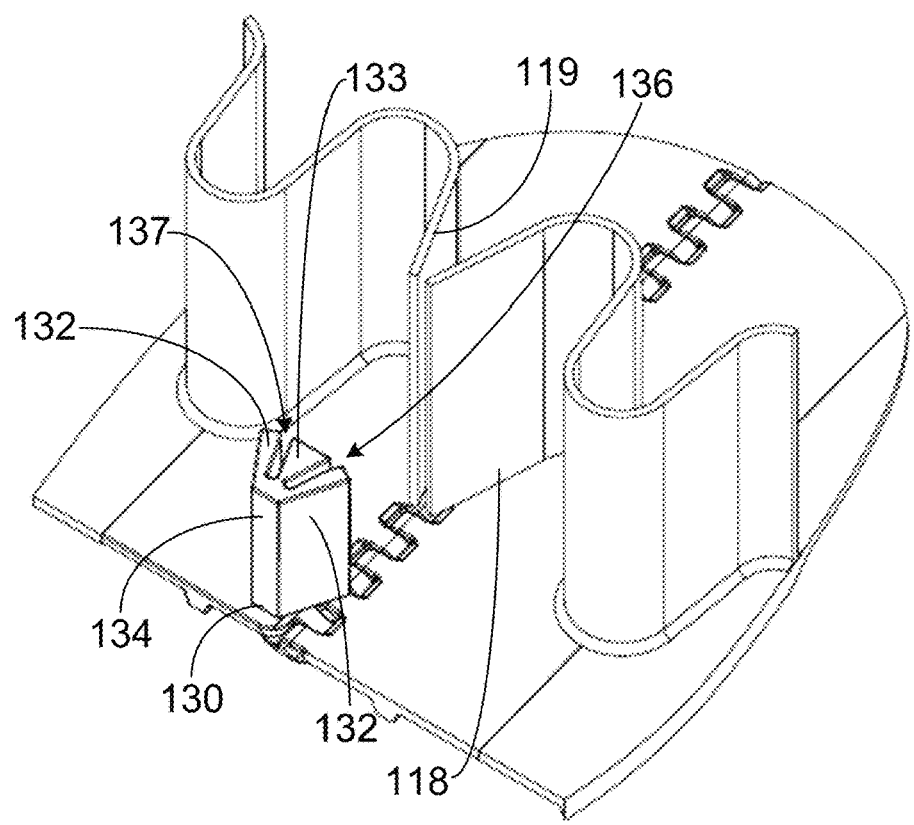
FIGS. 12A and 12B are views of one side of a conveyor belt before and after its sidewalls are fastened by a W-shaped clip.
Figure 12B:
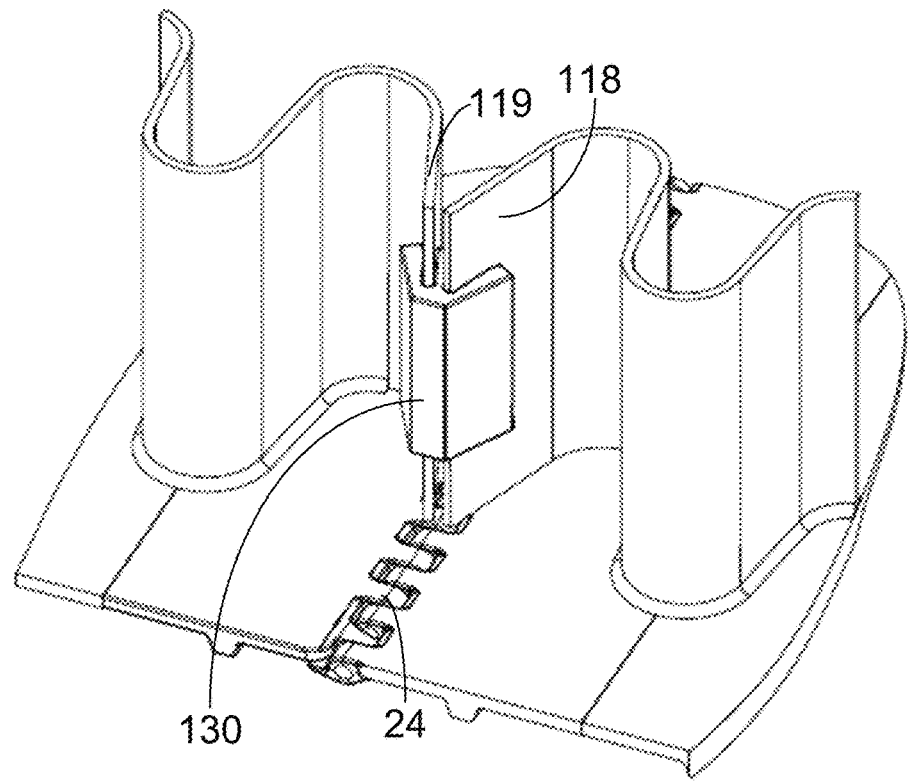

Two segment sidewall ends 118, 119 are held together by a W-shaped clip 130 in FIGS. 12A and 12B. The clip 130 has two outer legs 132 and an inner leg 133 that extend from a base 134. Clip slots 136, 137 are formed between the outer legs 132 and the inner leg 133. The slots 136, 137 are oblique to each other and diverge from each other toward their open ends. Each slot 136, 137 receives a corresponding one of the segment sidewall ends 118, 119 in an interference fit clamping the segment sidewalls. As with the U-shaped clip 110 of FIG. 10B, the W-shaped clip 130 joins the two sidewall ends 118, 119 above the hinge joint 24.

Figure 13:
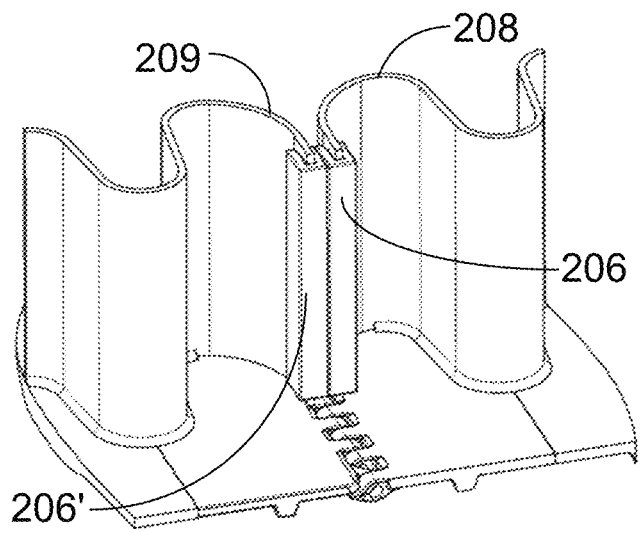
FIG. 13 is a view of one side of a conveyor belt with its sidewalls fastened by two magnetic clips.
Figures 14, 15:
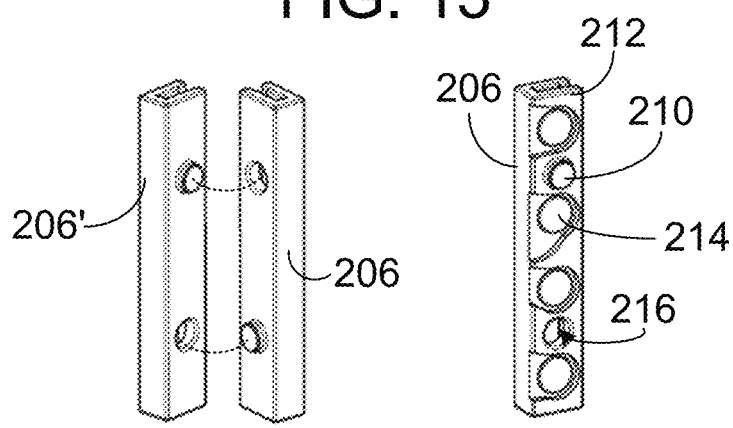
FIG. 14 is a view of the two magnetic clips of FIG. 13.
FIG. 15. is a cut-away view of the magnetic clip of FIG. 14 revealing the permanent magnets.

Two clips 206, 206' clamped around each segment sidewall end 208, 209 are shown in FIG. 13. Permanent magnets 210 are embedded in a leg 212 of the clip 206, as shown in FIG. 15. The two clips 206, 206' are identical with a button 214 and a hole 216 in the leg 212. As shown in FIG. 14, the identical magnetic clips 206, 206' are arranged so that the holes 216 and buttons 214 in the confronting legs 212 can mate and guarantee that the permanent magnets 210 in each clip are aligned. In that way the two segment sidewall ends 208, 209 are fastened and easily unfastened.

Figure 16:
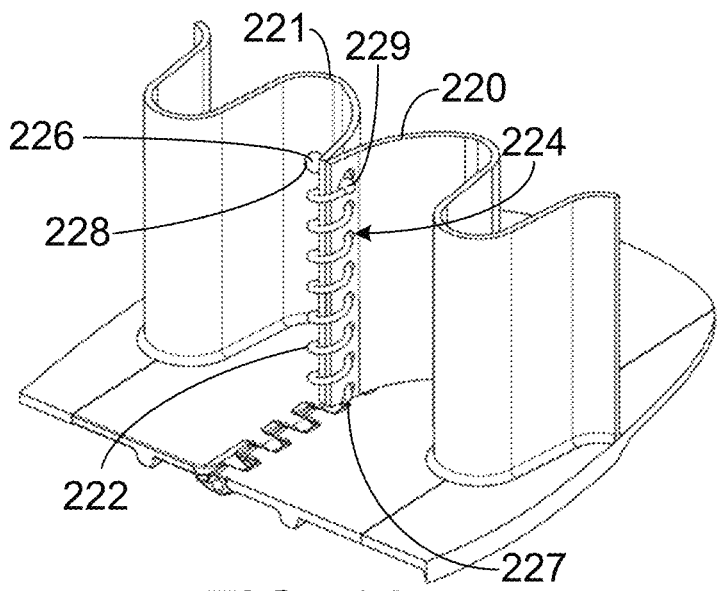
FIG. 16 is a view of one side of a conveyor belt whose sidewalls are fastened by a spiral wire.

Two segment sidewall ends 220, 221 are shown in FIG. 16 fastened by a spiral wire 222. Each segment sidewall end 220, 221 has a series of regularly spaced holes 224. The holes 224 in the first segment sidewall end 220 align with those in the second segment sidewall end 221. The spiral wire 222 extends from a head end 226 to a tail end 227. An enlarged head 228 whose dimensions are greater than the dimensions of the holes 224 terminates the wire's head end 226. A bead 229 on the spiral wire 222 is spaced from the enlarged head 228 along the spiral by a distance slightly greater than the combined thickness of the two segment sidewalls ends 220, 221. The tail end 227 is threaded through the aligned holes 224 starting at the top of the segment sidewall ends 220, 221 until the bead 229 passes through the topmost holes. As the bead 229 is pushed through the topmost holes, it temporarily widens the holes. Once the bead is through, the holes return to their relaxed positions by the elastic properties of the segment sidewall. The enlarged head 228 and bead 229 on opposite sides of the joined segment sidewall ends lock the spiral wire 222 in place.

Figure 17:
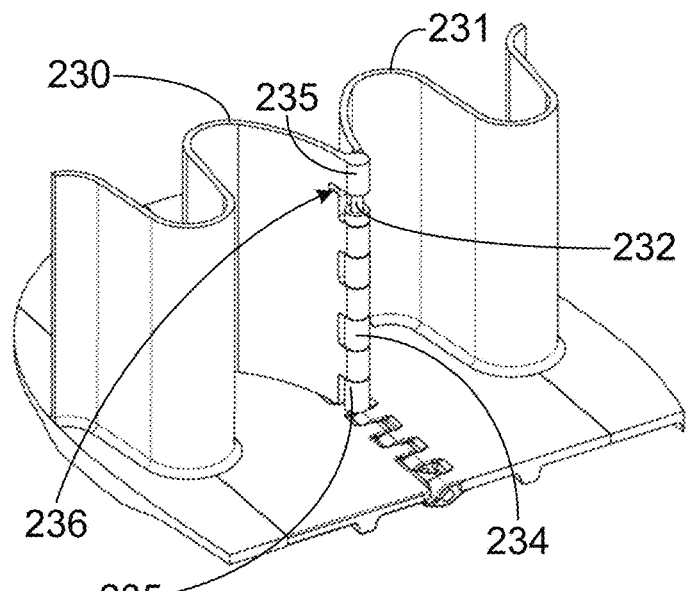
FIG. 17 is a view of one side of a conveyor belt whose sidewalls are fastened by a connecting pin through aligned eyelets.

FIG. 17 shows another version of a sidewall fastener that holds segment sidewall ends 230, 231 together with a connecting pin 232. Eyelets 234, 235 are integrally formed with the segment sidewall along the edges of the segment sidewall ends 230, 231. Interior eyelets 234 have holes that extend completely through. Top and bottom eyelets 235 have holes that are blocked at ends distal from the interior eyelets 234. A slit 236 in the end of the first segment sidewall end 230 allows the top eyelet 235 to be elastically bent out of alignment with the other eyelets so that the connecting pin 232 can be inserted into or withdrawn from the vertical passageway formed by the aligned holes of the interleaved eyelets 234, 235 of the two segment sidewall ends 230, 231. The top eyelet 235 is allowed to return to its relaxed state capping the top end of the connecting pin 232 to lock it in place fastening the sidewall ends together. (One of the interior eyelets 234 is cut away to show the connecting pin 232.)

Figure 18:
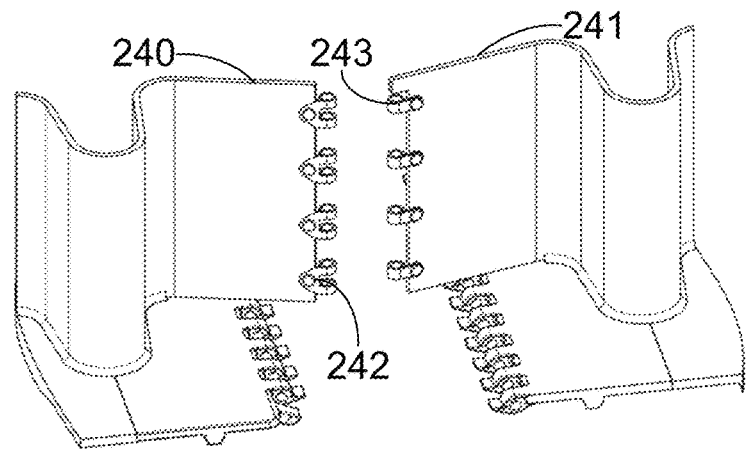
FIG. 18 is a view of two belt segments with integral mating metal laces on each sidewall.
Figure 19:
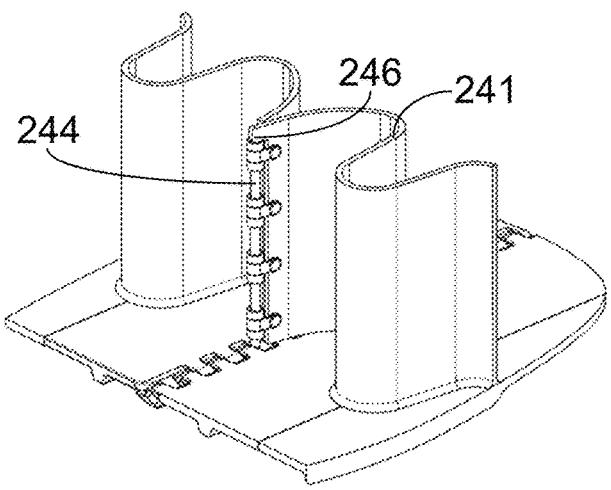
FIG. 19 is a view of the two belt segments of FIG. 18 fastened together by a connecting pin.

A similar fastening system to that of FIG. 17 is shown in FIGS. 18 and 19. In this version the confronting edges of two segment sidewall ends 240, 241 have metal hinged belt-lacing elements 242, 243 permanently riveted to the sidewalls. Each of the lacing elements 242 on the first segment sidewall end 240 has two eyelets. Each of the lacing elements 243 on the second segment sidewall end 241 has a single eyelet. When the confronting ends of the two segment sidewall ends 240, 241 are brought together, the single eyelets of the lacing elements 243 are received between the two eyelets of the mating lacing elements 242, as shown in FIG. 19. A connecting pin 244 extends through the vertical passageway formed by the aligned, interleaved eyelets to fasten the segment sidewall ends 240, 241 together. An integral protrusion 246 at the top end of the second segment sidewall end 241 is flexed out of the way during insertion or withdrawal of the connecting pin 244. In its relaxed state the protrusion 246 blocks the passageway. Other versions of hinged belt-lacing elements, such as those with multiple eyelets on both lacing elements, could alternatively be used.

The first and second ends of the segment sidewalls are not welded to the belt segments. In that way they can be folded and can bridge the hinge joints without attachment to the top of the belt segments at or close to the hinge joints. In all the drawings the welded portions of the segment sidewalls are indicated by weld beads 140 along the bottoms of the sidewalls as shown in FIG. 6E and 10B, for example. Those portions of the ends 88, 89, 118, 119 of the sidewalls not welded to the belt segments are clearly indicated in the drawings without weld beads along their bottoms 142. The weld beads 140 terminate close enough to the hinge joints 24 that how to fold or otherwise align the unwelded portions of the sidewall ends 88, 89, 118, 119 for joining is generally unambiguous to a human technician. Although each of the segment sidewalls is shown with a continuous weld line between the segment sidewall ends, the welds could be intermittent between the ends.

Figure 22:
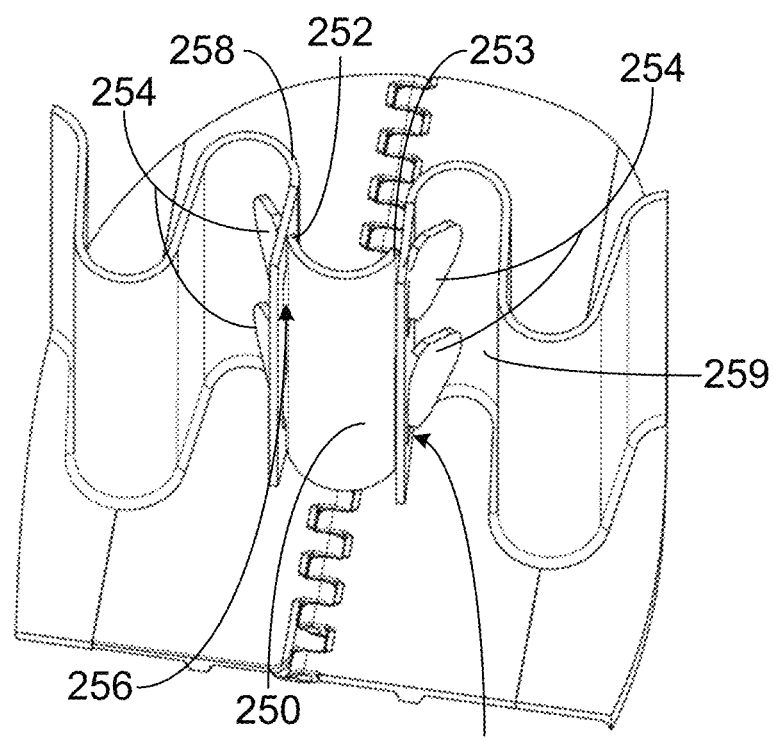
FIG. 22 is an axonometric view of a first version of a sidewall patch fastener.

Another fastening system is shown in FIG. 22. A flexible sidewall patch 250 extends from a first side edge 252 to an opposite second side edge 253. Patch fastening elements in the form of integral tabs 254 with oversized heads extend from the first and second side edges 252, 253. Complementary fastening elements in the form of slots 256 are formed in the ends of segment sidewalls 258, 259. The tabs 254 at the side edges 252, 253 of the sidewall patch 250 are inserted into the slots 254 at the ends of the two segment sidewalls 258, 259 to be joined to form a continuous sidewall. If the tabs 254 happen to break off or the sidewall patch 250 is otherwise damaged, a new sidewall patch can simply replace the damaged patch. No reworking of the segment sidewalls is necessary.

Figure 23:
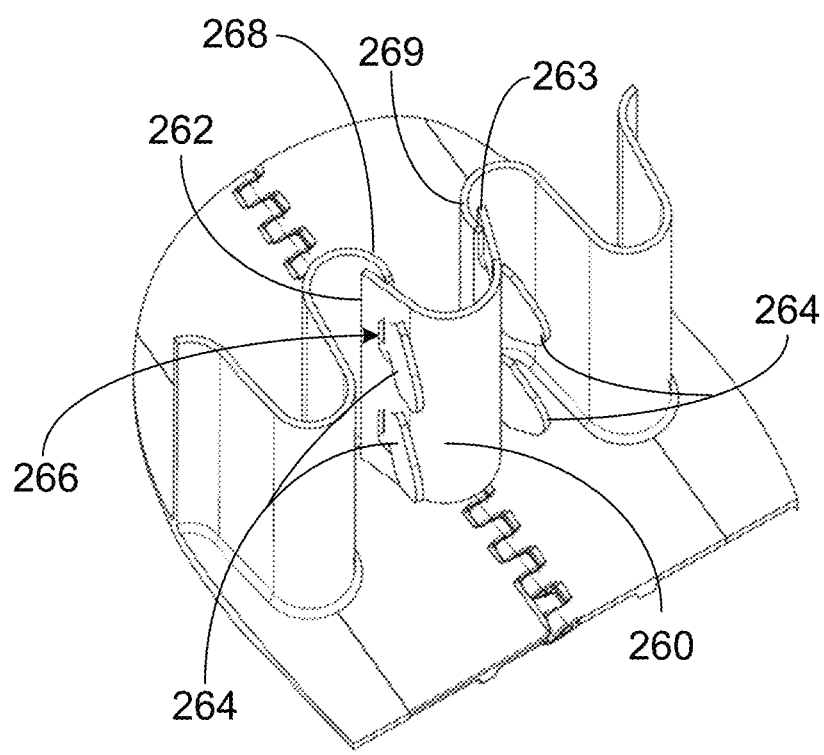
FIG. 23 is an axonometric view of a second version of a sidewall patch fastener.

In the fastening system of FIG. 23, a flexible sidewall patch 260 extends from a first side edge 262 to an opposite second side edge 263. In this version the fastening elements are the reverse of those shown in FIG. 22. Tabs 264 extending from the first and second ends of segment sidewalls 268, 269 are inserted into slots formed in first and second side edges 262, 263 of the sidewall patch 260 to form a continuous sidewall.

In the fasteners shown in FIGS. 22 and 23, the flexible sidewall patches 250, 260 can be made of the same material or have the same thickness and height as the segment sidewalls to match the rest of the sidewall. Or the sidewall patches could be made of a rigid material having the curved shape assumed by the flexible sidewalls when installed. Instead of two pairs of fastening elements at each end, one or more than two pairs could be used. Furthermore, the segment sidewalls could have tabs and slots at its ends, and the sidewall patch could have complementary slots and tabs at its side edges. Other fastening elements, such as those previously described, could be used in a sidewall patch.

All the fasteners can be unfastened by reversing the steps followed for fastening. So when a conveyor belt with sidewalls fastened at or near a hinge joint has to be removed from a conveyor for replacement, cleaning, or refurbishing, the segment sidewalls are first unfastened and then the hinge rod is removed from the hinge joint to separate the belt ends.

All the sidewall connections were shown on belts constructed of one or more belt segments whose ends were joined at hinge joints. But all the sidewall connections could be used on belts constructed of one or more segments whose ends were joined at stiffer or non-hinging joints formed in other ways, such as by butt welding or thermally splicing the ends or by interlocking the ends with mating locking or splicing structure. All references to first and second segments or first and second segment sidewalls mean: (a) separate segments or segment sidewalls in belts constructed of multiple segments joined at multiple joints; or (b) opposite ends of a single segment or segment sidewall in a belt constructed of a single segment whose opposite ends are joined at a single joint to form an endless belt loop.

What is claimed is:

1. A conveyor belt comprising:
    one or more belt segments joined at one or more joints into an endless conveyor belt loop that extends in width from a first side to a second side;
    one or more segment sidewalls, each extending from a first end to a second end along one of the belt segments proximate the first side or the second side of the conveyor belt loop;
    one or more fasteners, each joining a first end of a segment sidewall to a second end of a segment sidewall proximate each of the one or more joints to form a continuous sidewall proximate the first side or the second side and bridging the one or more joints;
    wherein the fastener is a toolless fastener requiring no tools to join the first end and the second end;
    wherein the one or more segment sidewalls have bottoms attached to the belt segments along their lengths except at the first and second ends.

2. A conveyor belt as claimed in claim 1 wherein the fastener comprises a clip having one or more slots receiving the first and second ends in interference fits.

3. A conveyor belt as claimed in claim 1 wherein the fastener comprises a clip joining the first and second ends together.

4. A conveyor belt as claimed in claim 3 wherein the clip is U-shaped, S-shaped, or W-shaped.

5. A conveyor belt as claimed in claim 3 wherein the clip is U-shaped with a single clip slot into which the first and second ends are clipped together in an interference fit.

6. A conveyor belt as claimed in claim 3 wherein the clip is S-shaped with a pair of oppositely open clip slots: a first clip slot receiving the first end and a second clip slot receiving the second end in interference fits.

7. A conveyor belt as claimed in claim 3 wherein the clip is W-shaped with a pair of clip slots: a first clip slot receiving the first end and a second clip slot receiving the second end in interference fits.

8. A conveyor belt as claimed in claim 1 wherein the fastener comprises a first clip having a slot receiving the first end and a second clip having a slot receiving the second end and wherein the first and second clips have permanent magnets attracting the first clip to the second clip to join the first and second ends.

9. A conveyor belt as claimed in claim 1 wherein the fastener comprises:
    a first fastener element integral with the segment sidewall at the first end;
    a second fastener element integral with the segment sidewall at the second end;
    wherein the one or more segment sidewalls are joined first end to second end by engaging the first fastener elements with the second fastener elements to interlock the first ends with the second ends and form a continuous sidewall bridging the one or more joints.

10. A conveyor belt as claimed in claim 9 wherein the first fastener element is a tab extending from the first end and the second fastener element is a wall slot formed in the second end sized to receive and retain the tab at the first end.

11. A conveyor belt as claimed in claim 10 wherein the tab has an enlarged head having an outer dimension greater than the maximum dimension of the wall slot.

12. A conveyor belt as claimed in claim 11 wherein the enlarged head is rigid and the second end is flexible enough so that the second end can be elastically deformed to enlarge the wall slot during insertion of the enlarged head through the wall slot.

13. A conveyor belt as claimed in claim 11 wherein the enlarged head is in the shape of an arrowhead.

14. A conveyor belt as claimed in claim 10 wherein the tab or the second end is flexible enough so that the tab can be elastically deformed or the second end can be elastically deformed to enlarge the wall slot during insertion of the tab into the wall slot.

15. A conveyor belt as claimed in claim 10 wherein the wall slot opens onto an edge of the segment sidewall.

16. A conveyor belt as claimed in claim 10 wherein the wall slot has a closed periphery.

17. A conveyor belt as claimed in claim 10 wherein the tab has an enlarged head and a neck connecting the enlarged head to an edge of the first end of the segment sidewall and wherein the wall slot opens onto an edge of the second end of the segment sidewall through a narrowed gap and wherein the width of the gap is less than the width of the neck to retain the tab in the wall slot.

18. A conveyor belt as claimed in claim 10 wherein the tab is hook-shaped with a shank and a hook end and wherein the wall slot has an open side to receive the shank with the hook end hooked to the second segment sidewall.

19. A conveyor belt as claimed in claim 9 comprising at least two pairs of first and second fasteners at the first and second ends.

20. A conveyor belt as claimed in claim 9 wherein the first fastener element is a male snap and the second fastener element is a female snap that snap together.

21. A conveyor belt as claimed in claim 1 wherein the one or more fasteners include:
an upper tab, a lower tab, and a middle tab between the upper and lower tabs extending from the first end;
an upper wall slot, a lower wall slot, and a middle wall slot between the upper and lower wall slots in the second end;
wherein the upper, lower, and middle wall slots in the second end are sized to receive and retain the upper, lower, and middle tabs extending from the first end.

22. A conveyor belt as claimed in claim 21 wherein the upper tab extends obliquely upward from the first end and the lower tab extends obliquely downward from the first end and wherein the second end has a vertical edge and wherein the upper wall slot is elongated upwardly and outwardly toward the vertical edge and the lower wall slot is elongated downwardly and outwardly toward the vertical edge.

23. A conveyor belt as claimed in claim 1 wherein the one or more fasteners are made of materials magnetically attracted to each other.

24. A conveyor belt as claimed in claim 23 wherein the one or more fasteners each include one or more first permanent magnets in the first end and one or more second permanent magnets or one or more ferrous elements in the second end.

25. A conveyor belt as claimed in claim 1 wherein the one or more fasteners join the first and second ends above the joints.

26. A conveyor belt as claimed in claim 1 wherein the one or more fasteners join the first and second ends offset along the endless conveyor belt loop from the joints.

27. A conveyor belt as claimed in claim 1 wherein the bottoms of the one or more segment sidewalls are welded to the belt segments along their lengths except at the first and second ends.

28. A conveyor belt as claimed in claim 1 wherein the fastener comprises a series of holes through the first and second ends and a spiral wire threaded through the holes in the first and second ends to fasten the first and second ends together.

29. A conveyor belt as claimed in claim 28 wherein the spiral wire has an enlarged head at one end and a bead spaced from the head by a distance slightly greater than the combined thickness of the first and second ends and wherein the dimensions of the head and the bead are greater than the dimensions of the holes.

30. A conveyor belt as claimed in claim 1 wherein the fastener includes:
a first series of eyelets spaced vertically along the first end;
a second series of eyelets spaced vertically along the second end;
a connecting pin;
wherein the first series of eyelets are interleaved with the second series of eyelets and aligned vertically to form a vertical passageway receiving the connecting pin to join the first and second ends.

31. A conveyor belt as claimed in claim 30 wherein the first and second series of eyelets are metal hinged belt-lacing elements.

32. A conveyor belt as claimed in claim 1 wherein the one or more fasteners comprise:
a first fastener element integral with the segment sidewall at the first end;
a second fastener element integral with the segment sidewall at the second end;
a flexible sidewall patch extending from a first side edge to an opposite second side edge and having a first patch fastener element at the first side edge and a second patch fastener element at the second side edge;
wherein the one or more segment sidewalls are joined by engaging the first fastener elements with the first patch fastener elements and engaging the second fastener elements with the second patch fastener elements to form a continuous sidewall bridging the one or more joints.

33. A conveyor belt as claimed in claim 32 wherein the first fastener element includes one or more first tabs extending from the first end and the first patch fastener element includes one or more slots formed in the first side edge sized to retain the one or more first tabs at the first end, or vice versa, and wherein the second fastener element includes one or more second tabs extending from the second end and the second patch fastener element includes one or more slots formed in the second side edge sized to retain the one or more second tabs at the second end, or vice versa.

34. A conveyor belt as claimed in claim 32 wherein the flexible sidewall patch and the segment sidewall are made of the same material.

35. A conveyor belt as claimed in claim 32 wherein the flexible sidewall patch and the segment sidewall have the same thickness or the same height.

36. A conveyor belt comprising:
one or more belt segments joined at one or more joints into an endless conveyor belt loop that extends in width from a first side to a second side;
one or more segment sidewalls, each extending from a first end to a second end along one of the belt segments proximate the first side or the second side of the conveyor belt loop,
wherein each of the segment sidewalls include includes:
a first fastener element integral with the segment sidewall at the first end;
a second fastener element integral with the segment sidewall at the second end;
wherein the one or more segment sidewalls are joined first end to second end by engaging the first fastener elements with the second fastener elements to interlock the first ends with the second ends and form a continuous sidewall proximate the first side or the second side and bridging the one or more joints;
wherein the one or more segment sidewalls have bottoms attached to the belt segments along their lengths except at the first and second ends.

37. A conveyor belt as claimed in claim 36 comprising at least two first and second fasteners at the first and second ends.

38. A conveyor belt as claimed in claim 36 wherein the one or more fasteners include a permanent magnet.

39. A conveyor belt as claimed in claim 36 wherein the first fastener element is a male snap and the second fastener element is a female snap that snap together.

40. A conveyor belt as claimed in claim 36 wherein the one or more fasteners join the first and second ends above the joints.

41. A conveyor belt as claimed in claim 36 wherein the one or more fasteners join the first and second ends offset along the endless conveyor belt loop from the joints.

42. A conveyor belt as claimed in claim 36 wherein the bottoms of the one or more segment sidewalls are attached to the belt segments by welding.

43. A conveyor belt comprising:
one or more belt segments joined at one or more joints into an endless conveyor belt loop that extends in width from a first side to a second side;
one or more segment sidewalls, each extending from a first end to a second end along one of the belt segments proximate the first side or the second side of the conveyor belt loop, wherein each of the segment sidewalls includes:
a first fastener element integral with the segment sidewall at the first end;
a second fastener element integral with the segment sidewall at the second end;
wherein the one or more segment sidewalls are joined first end to second end by engaging the first fastener elements with the second fastener elements to interlock the first ends with the second ends and form a continuous sidewall proximate the first side or the second side and bridging the one or more joints;
wherein the first fastener element is a tab extending from the first end and the second fastener element is a wall slot formed in and extending through the second end sized to receive and retain the tab at the first end.

44. A conveyor belt as claimed in claim 43 wherein the tab has an enlarged head having an outer dimension greater than the maximum dimension of the wall slot.

45. A conveyor belt as claimed in claim 43 wherein the tab is a rigid knob and the wall slot is round and the second end is flexible enough so that the second end can be elastically deformed to enlarge the round wall slot during insertion of the rigid knob through the wall slot.

46. A conveyor belt as claimed in claim 43 wherein the tab or the second end is flexible enough so that the tab can be elastically deformed or the second end can be elastically deformed to enlarge the wall slot during insertion of the tab into the wall slot.

47. A conveyor belt as claimed in claim 43 wherein the tab has an enlarged head and a neck connecting the enlarged head to an edge of the first end of the segment sidewall and wherein the wall slot opens onto an edge of the second end of the segment sidewall through a narrowed gap and wherein the width of the gap is less than the width of the neck to retain the tab in the wall slot.

48. A conveyor belt as claimed in claim 43 wherein the tab is hook-shaped with a hook end hooked to the second segment sidewall through the wall slot.

49. A conveyor belt comprising:
one or more belt segments joined at one or more joints into an endless conveyor belt loop that extends in width from a first side to a second side;
one or more segment sidewalls, each extending from a first end to a second end along one of the belt segments proximate the first side or the second side of the conveyor belt loop;
one or more clips, each joining a first end of a segment sidewall to a second end of a segment sidewall proximate each of the one or more joints to form a continuous sidewall proximate the first side or the second side and bridging the one or more joints.

50. A conveyor belt as claimed in claim 49 wherein the clip has one or more slots receiving the first and second ends in interference fits.

51. A conveyor belt as claimed in claim 49 wherein the clip is U-shaped with a single clip slot into which the first and second ends are clipped together in an interference fit.

52. A conveyor belt as claimed in claim 49 wherein the clip is S-shaped with a pair of oppositely open clip slots: a first clip slot receiving the first end and a second clip slot receiving the second end in interference fits.

53. A conveyor belt as claimed in claim 49 wherein the clip is W-shaped with a pair of clip slots: a first clip slot receiving the first end and a second clip slot receiving the second end in interference fits.

54. A conveyor belt as claimed in claim 49 wherein a first one of the clips has a slot receiving the first end and a second one of the clips has a slot receiving the second end and wherein the clips have permanent magnets that attract each other to hold the first and second ones of the clips together to fasten the first and second ends.

* * * * *